(12) United States Patent
Cha et al.

(10) Patent No.: US 8,554,937 B2
(45) Date of Patent: Oct. 8, 2013

(54) METHOD AND SYSTEM FOR TRANSMITTING AND RECEIVING DATA USING MULTICASTING

(75) Inventors: Soon-back Cha, Suwon-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1693 days.

(21) Appl. No.: 11/254,179

(22) Filed: Oct. 20, 2005

(65) Prior Publication Data
US 2006/0106939 A1 May 18, 2006

(30) Foreign Application Priority Data
Nov. 2, 2004 (KR) .......................... 10-2004-0088409

(51) Int. Cl.
*G06F 15/16* (2006.01)
*H04J 1/16* (2006.01)
*H04L 12/28* (2006.01)

(52) U.S. Cl.
USPC ........... 709/230; 709/205; 709/227; 370/230; 370/235; 370/390

(58) Field of Classification Search
USPC .......................................................... 709/205
See application file for complete search history.

(56) References Cited

U.S. PATENT DOCUMENTS

| | | | | |
|---|---|---|---|---|
| 6,138,144 A * | 10/2000 | DeSimone et al. | ............ | 709/204 |
| 6,181,697 B1 * | 1/2001 | Nurenberg et al. | ............ | 370/390 |
| 6,259,701 B1 * | 7/2001 | Shur et al. | ...................... | 370/401 |
| 6,836,806 B1 * | 12/2004 | Raciborski et al. | ........... | 709/245 |
| 6,873,627 B1 * | 3/2005 | Miller et al. | .................... | 370/466 |
| 6,957,277 B2 * | 10/2005 | Yagyu et al. | ................... | 709/245 |
| 7,035,257 B2 * | 4/2006 | Vafaei | ............................ | 370/389 |
| 7,480,295 B2 * | 1/2009 | Sung et al. | ..................... | 370/390 |
| 2001/0018714 A1 | 8/2001 | Yagyu et al. | | |
| 2002/0009083 A1 * | 1/2002 | Ambe et al. | .................. | 370/390 |
| 2002/0085507 A1 * | 7/2002 | Ku et al. | ....................... | 370/255 |
| 2002/0143951 A1 * | 10/2002 | Khan et al. | ..................... | 709/227 |
| 2002/0198959 A1 * | 12/2002 | Nishi et al. | .................... | 709/217 |
| 2003/0147390 A1 * | 8/2003 | Rizzo et al. | .................... | 370/390 |

(Continued)

FOREIGN PATENT DOCUMENTS

| | | |
|---|---|---|
| KR | 2003-0051429 A | 6/2003 |
| KR | 10-2003-0058267 A | 7/2003 |
| KR | 10-2004-0064686 A | 7/2004 |

OTHER PUBLICATIONS

Communication dated Apr. 26, 2011, issued by the State Intellectual Property Office of P.R. China in counterpart Chinese Application No. 200510108169.

*Primary Examiner* — Wing F Chan
*Assistant Examiner* — David X Yi
(74) *Attorney, Agent, or Firm* — Sughrue Mion, PLLC (57) ABSTRACT

A system and method for transmitting and receiving data using multicasting are provided. The system and method enables Internet Protocol (IP) communication between a server and a client that do not know IP information about the other party. The system includes an information management unit storing information about a client and a group the client belongs to, a packet generation unit generating a packet to be transmitted to the client, a packet transceiver transmitting the packet to and receiving a packet from the client through a multicast socket, and a data transmitter transmitting data to the client using the information about the client contained in the packet received from the client.

19 Claims, 6 Drawing Sheets

UNICAST    BROADCAST    MULTICAST

SUB NETWORK     HOST

(56) References Cited

U.S. PATENT DOCUMENTS

| | | | |
|---|---|---|---|
| 2003/0218980 A1* | 11/2003 | Fukushima et al. | 370/230 |
| 2004/0264461 A1* | 12/2004 | Janneteau et al. | 370/390 |
| 2005/0080916 A1* | 4/2005 | Katayama | 709/232 |
| 2005/0265333 A1* | 12/2005 | Coffey et al. | 370/389 |
| 2007/0002858 A1* | 1/2007 | Bichot et al. | 370/390 |

* cited by examiner

FIG. 1

UNICAST     BROADCAST     MULTICAST

□ SUB NETWORK     ○ ● HOST

FIG. 2

CLIENT    IP : X.X.X.X    SERVER
Port : X

IP : X.X.X.X
Port : X

FIG. 5

METHOD AND SYSTEM FOR TRANSMITTING AND RECEIVING DATA USING MULTICASTING

CROSS-REFERENCE TO RELATED APPLICATION

This application claims priority from Korean Patent Application No. 10-2004-0088409 filed on Nov. 2, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to transmitting and receiving data using multicasting, and more particularly, to performing Internet Protocol (IP) communication using multicasting by transmitting and receiving a packet containing IP information between a server and a client that do not know IP information about the other party.

2. Description of the Related Art

There are three types of IP addresses: unicast, broadcast, and multicast.

For a host on a shared network such as Ethernet, each Ethernet frame contains source and destination Ethernet addresses. Each Ethernet frame is typically sent to a single host and a destination address specifies a single interface.

Unicasting such as Ping, Telnet, FTP, and WWW is communication between a single sender and a single receiver.

A host may send a frame to all hosts on a network, which is called broadcasting.

Broadcasting used to send only one data to multiple clients is more efficient than unicasting in terms of line usage but cannot provide reliable delivery of data.

Multicasting stands in the middle of the scale of "unicast-multicast-broadcast" and is used to send each frame to a selected group of receivers on a network.

Multicasting is an efficient way of delivering one-to-many or many-to-many communications and uses a multicast group address to send a continuous data stream.

The drawback of broadcasting is that even a host which is not related to the broadcast frame must process the received frame.

On the other hand, a multicast method prevents an unnecessary packet from being delivered to the other hosts as would be the case in a broadcast method, because source data is duplicated and routed to a client.

Multicasting is used to reduce the load of a non-related host, and a host is a member of one or more multicast groups.

Figure 1:
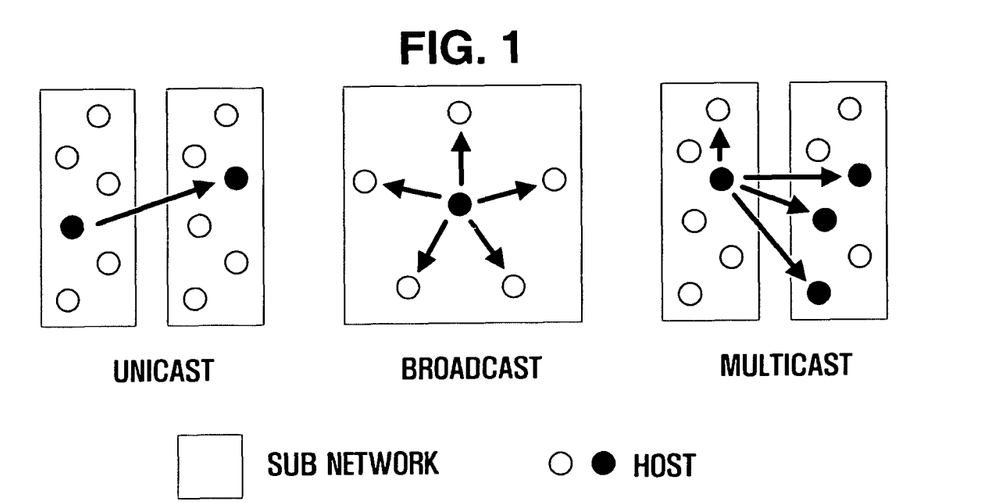
FIG. 1 is a conceptual diagram of conventional unicast, broadcast, and multicast models.

FIG. 1 is a conceptual diagram showing conventional unicast, broadcast, and multicast models.

Referring to FIG. 1, in the unicast model, a sender transmits data to a receiver on the same or different network. To transmit the same data to multiple receivers, the sender must reproduce the same number of copies of data as the number of receivers, thus leading to increased network load.

In the broadcast model, a sender can transmit data to multiple receivers on the same network using a single copy of data.

In the multicast model, a sender may transmit data to multiple receivers on the same or different network. The duplication amount of data varies depending on the logical position of receivers.

An IP may be installed on a personal computer (PC) either manually or automatically.

To install IP manually, a user asks a network administrator for basic information and directly inputs the information such as an IP address, a default gateway, a subnet mask, and a domain name server (DNS) assigned to a PC. In this case, the IP address, typically called a static IP address, is used for a PC to access the Internet.

To install IP automatically, Dynamic Host Configuration Protocol (DHCP) is used. That is, a DHCP server automatically assigns an IP address, a default gateway, a subnet mask, and a DNS.

The IP address is assigned by the DHCP server through search, proposal, request, and authentication.

When a PC boots up, it requests allocation of IP from a DHCP server and the DHCP server assigns one of its own IP addresses to the PC. The IP address automatically assigned to the PC can change each time the PC boots. This is called a dynamic IP address.

In general, unicasting is used for data communication between PCs. A sending PC must know the IP address and Port number of a receiving PC which vary depending on the type of a transmission protocol such as Hyper Text Transfer Protocol (HTTP), File Transport Protocol (FTP), or Telnet in order to send a data packet using unicasting.

The data packet contains IP information (IP addresses and port numbers) regarding the sending PC and the receiving PC. When IP information regarding the receiving PC is changed, the sending PC modifies IP information regarding the receiving PC contained in the data packet for transmission.

Figure 2:
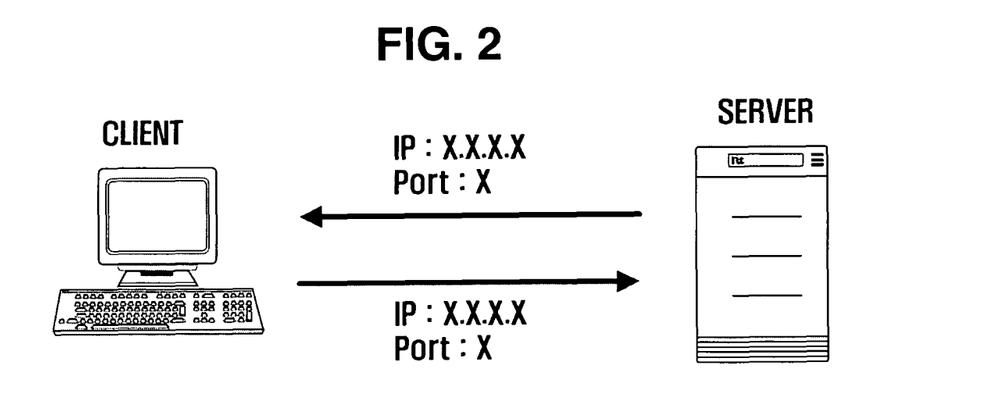
FIG. 2 is a conceptual diagram of conventional IP communication.

FIG. 2 is a conceptual diagram of conventional IP communication.

A header in a data packet transmitted from a sender to a receiver contains IP address and port number of the sender which vary depending on a transmission protocol and IP address and port number of the receiver.

The sender sends the data packet to the receiver through a routing path and the receiver then sends an acknowledgement (ACK) back to the sender.

To receive data from a server in a client-server network architecture, the client must be aware of the IP information of the server. When the server has a dynamic IP address, the address of the server contained in a sending data packet needs to be modified for transmission each time the address changes. Therefore, an apparatus and method are needed which transmits and receives a packet containing IP information.

SUMMARY OF THE INVENTION

The present invention provides a system and method for performing IP communication using a multicast socket by transmitting and receiving a packet containing IP information between a server and a client that do not know IP information about the other party.

The present invention also provides a method for allowing a server or a client that do not know IP information about the other party to be informed of the status of the other party.

The present invention also provides a method for enabling a server to manage clients by group. The group may comprise clients that are selected from among a plurality of clients supporting a specific data service and satisfying predetermined common requirements.

According to an aspect of the present invention, there is provided a system for transmitting and receiving data using multicasting including an information management unit storing information about a client and a group the client belongs to, a packet generation unit generating a packet to be transmitted to the client; a packet transceiver transmitting the packet to and receiving a packet from the client through a multicast socket, and a data transmitter transmitting data to the client using the information about the client contained in the packet received from the client.

According to another aspect of the present invention, there is provided a system for transmitting and receiving data using multicasting, the system including a packet generation unit generating a packet to be transmitted to a server providing a data service, a packet transceiver transmitting the packet through a multicast socket while receiving a packet from the server, a storage storing information about the server contained in the packet received from the server, and a data receiver receiving data using the information about the server.

According to yet another aspect of the present invention, there is provided a method for transmitting and receiving data using multicasting, the method including creating a multicast socket, transmitting information about a network and the type of data service provided to a client or a group the client belongs to through the created multicast socket, receiving a request packet requesting transmission of the data service through the multicast socket, checking whether the client that has sent the request packet has the right to receive the data service, and providing the data service using information about the client contained in the request packet if the client is allowed to receive the data service.

According to a further aspect of the present invention, there is provided a method for transmitting and receiving data using multicasting, the method including creating a multicast socket, receiving the type of a data service and network information for receiving the data service through the created multicast socket, checking whether the data service is supported, transmitting a packet requesting transmission of the data service through the multicast socket when the data service is supported, and receiving data using the network information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
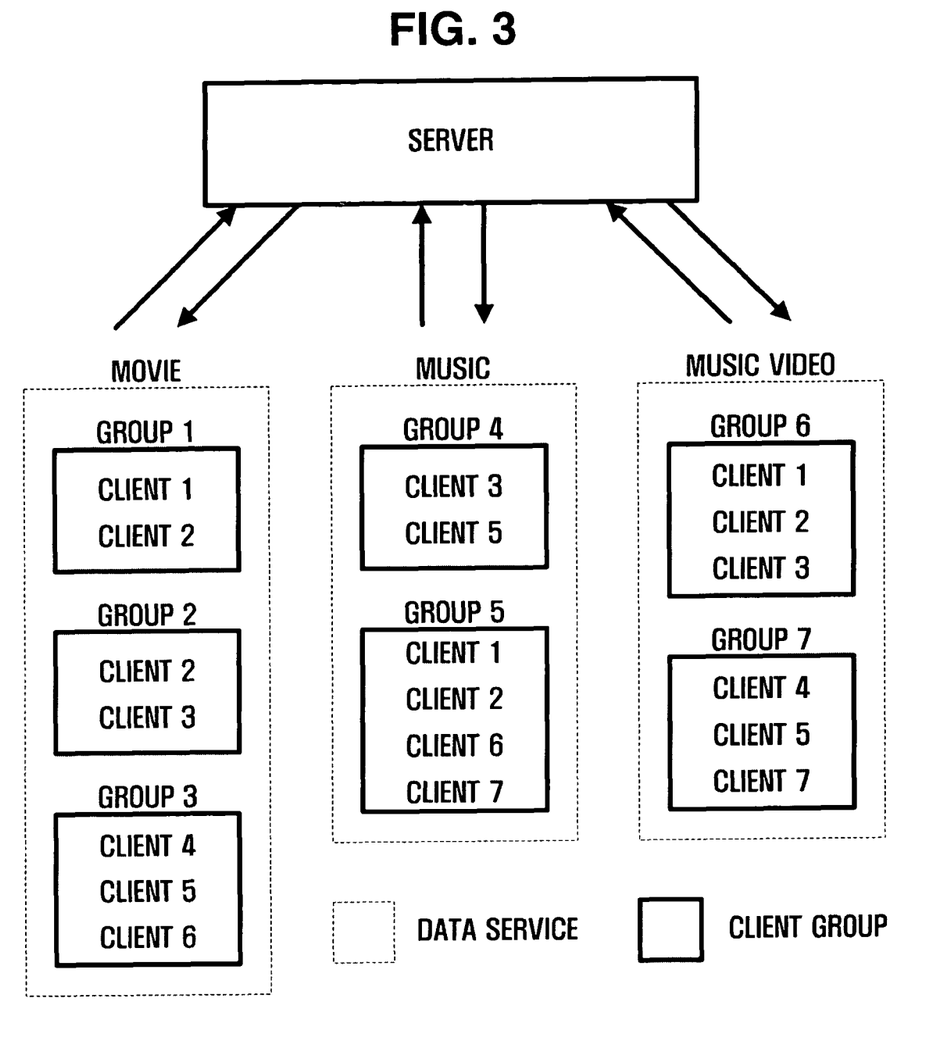
FIG. 3 is a diagram of a system for transmitting and receiving data using multicasting according to an exemplary embodiment of the present invention.

FIG. 3 is a diagram of a system for transmitting and receiving data using multicasting according to an exemplary embodiment of the present invention.

In the present invention, a server or a client transmits a packet to the other party on a network using multicasting.

While a packet may be transmitted on the same network, it may be sent to a server or a client on an external network in a network environment containing a multicast router.

An IP environment of a server may be static or dynamic.

A client that wishes to receive data from the server using unicasting must be aware of the IP address of the server in either a static or dynamic IP environment.

In particular, when an IP environment of the server is dynamic, the client must reset the IP environment of the server each time the IP address changes.

However, a server and a client that transmit and receive a packet containing IP information of the other party using multicasting use IP information of the other party contained in the packet to establish a unicast network, thus permitting the client that does not know IP information of the server to receive a data service from the server.

To accomplish this, the server and client on a network distribute an announcement packet whenever necessary.

A server announcement packet is used to inform a client of the existence of a server on a network providing a specific data service.

A client announcement packet is used to inform a server of the existence of a client on a network that desires to receive a specific data service.

The server announcement packet contains a packet type, an IP address, a port number, a data service type, and a server name. The client announcement packet contains a packet type, a data service type, the name of a group a client belongs to, a client name, and a hardware address.

An announcement packet may be distributed using broadcasting or multicasting when the server and the client are on the same network or using multicasting when they are located on different networks.

The server announcement packet is transmitted to a specific client group supporting a specific data service or all client groups. The specific client group can be determined by a communication protocol (HTTP, FTP, etc.) or the logical position of a client (LAN, WAN, or specific sub-network) or selected randomly by a client.

Thus, the server may store information about a client group supporting a specific data service. The server can terminate the specific data service when no client exists in the client group or determine whether to provide a data service for each client group.

A client creates a multicast socket comprising a multicast IP address and a port number and waits for receipt of a server announcement packet. The client receives the announcement packet from a server and checks whether the type of a service contained in the server announcement packet is supported by the client.

The client sends a request packet to the server through the created socket when the service type is supported by the client.

The request packet contains a packet type, a data service type, the name of a group the client belongs to, a client name, and a hardware address.

A port number of the socket created for the server and client to transmit and receive a packet using multicasting may vary depending on the type of a data service or client group.

By varying the port number of the socket, the server performs packet communication for each service type or client group to provide a data service to the client while the client receives only a data service through a port assigned to the client.

The server that receives the request packet from the client checks with the client to determine whether the client is entitled to receive the appropriate data service. When the client has the right to receive, the server establishes a unicast network with the client and sends data to an IP address and a port number of the client using IP information of the client.

Figure 4:
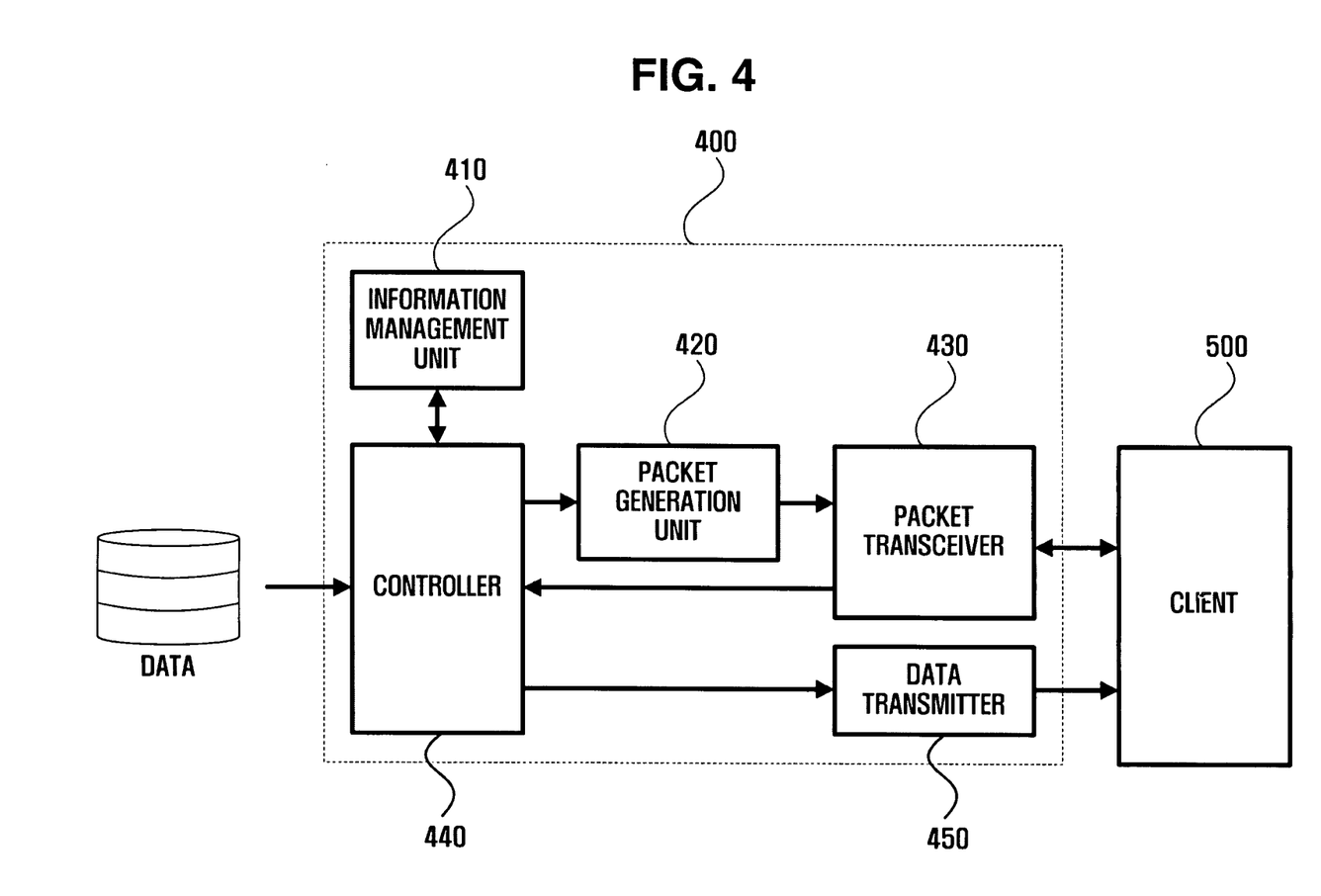
FIG. 4 is a block diagram of a server providing data services according to an exemplary embodiment of the present invention.

FIG. 4 is a block diagram of a server 400 providing data services according to an exemplary embodiment of the present invention.

Referring to FIG. 4, the server 400 includes an information management unit 410, a packet generation unit 420, a packet transceiver 430, a data transmitter 450, and a controller 440.

The information management unit 410 stores information regarding a client 500 that is classified into groups based on the type of data services.

The server 400 may classify the client 500 into several groups based on the type of data services for management, thus allowing all or some clients in a group to receive data while restricting supply of a specific data service to a specific client 500. A group may comprise clients that are selected from among a plurality of clients supporting a specific data service and satisfying predetermined common requirements.

The information regarding the client 500 contains the name, IP address, hardware address of the client 500, the name of a group the client 500 belongs to, the type of data services available, and the right to receive data services.

The packet generation unit 420 generates a packet to be transmitted to the client 500. Examples of the packet include an announcement packet, a query packet, a response packet, and a termination packet.

As described above, an announcement packet generated by the server 400 contains a one-byte packet type, a four-byte IP address, a two-byte port number, a four-byte data service type, a one-byte server name length, and a server name.

The server announcement packet has the following format:
{0x01, 0xAB00CD00, 0x0300, 0x00000001, 15, My Media Server}

The server 400 generates and distributes an announcement packet for each data service being delivered by the server 400.

When an IP environment is dynamic, an IP address can change from time to time. In this case, the packet generation unit 420 frequently checks an IP address of the server 400 and generates a packet containing the checked IP address.

A query packet generated by the server 400 is transmitted to check the status of the client 500 on a network and classified into two types: a query packet for all groups of clients and a query packet for a specific group of clients.

The server query packet contains a one-byte packet type, a four-byte data service type, a one-byte group name length, and the name of a group the client 500 belongs to.

The server query packets for all groups of clients and a specific group of clients respectively have the following formats:
{0x02, 0x00000001, 3, ALL}, {0x02, 0x00000001, 6, GROUP1}

A response packet generated by the server 400 is sent in response to a server query packet or a server request packet and contains a packet type (one byte), an IP address (four bytes), a port number (two bytes), a data service type (four bytes), the right to receive data services (one byte), a server name length (one byte), and a server name.

The server response packet has the following format:
{0x03, 0xAB00CD00, 0x0300, 0x00000001, 0x01, 15, My Media Server}

A termination packet created by the server 400 is used to inform all or some of clients that the server 400 is terminated.

The server termination packet contains a packet type (one byte), an IP address (four bytes), a port number (two bytes), a data service type (four bytes), a server name length (one byte), and a server name.

The server termination packet has the following format:
{0x04, 0xAB00CD00, 0x0300, 0x0000001, 15, My Media Server}

The packet transceiver 430 transmits an announcement packet, a query packet, a response packet, or a termination packet generated by the packet generation unit 420 to the client 500 while receiving an announcement packet, a query packet, a response packet, a request packet, or a termination packet from the client 500.

First, the server 400 communicates with the client 500 using multicasting.

That is, the server 400 present on the network creates a socket using a multicast IP address and a port number and communicates with the client 500 through the socket.

The server 400 sends the announcement packet, the query packet, the response packet, or the termination packet to the client 500 through the socket created using the multicast IP address and the port number.

As described above, like the server 400, the client 500 creates a socket using a multicast IP address and a port number and communicates with the server 400 through the socket.

The server 400 receives an announcement packet and a termination packet from the client 500 in order to check whether the client 500 will join the network.

A query packet generated by the client 500 is used to request a response to whether the server 400 provides a specific data service.

Once the query packet is sent to the controller 440, the controller 440 refers to the information management unit 410 and checks whether the server 400 provides the appropriate data service and whether the client 500 sending the query packet is allowed to receive the data service.

Then, the controller 440 generates a response packet containing the response and sends the same to the client 500 through the packet transceiver 430.

A request packet generated by the client 500 is used to request a specific data service from the server 400.

Once the request packet is sent to the controller 440, the controller 440 refers to the information management unit 410 and checks whether the client 500 sending the request packet is allowed to receive the data service.

If the client 500 is allowed to receive the data service, the controller 440 instructs the data transmitter 450 to send data. If not, the controller 440 instructs the data transmitter to send a response packet indicating that the client 500 has no right to receive the data service.

In this case, the data transmitter 450 sends the data to the client 500 using unicasting.

Since the server 400 is able to know IP information regarding the client 500 through the announcement packet and the request packet received from the client 500, it establishes a unicast network with the client 500 before transmitting data.

Figure 5:
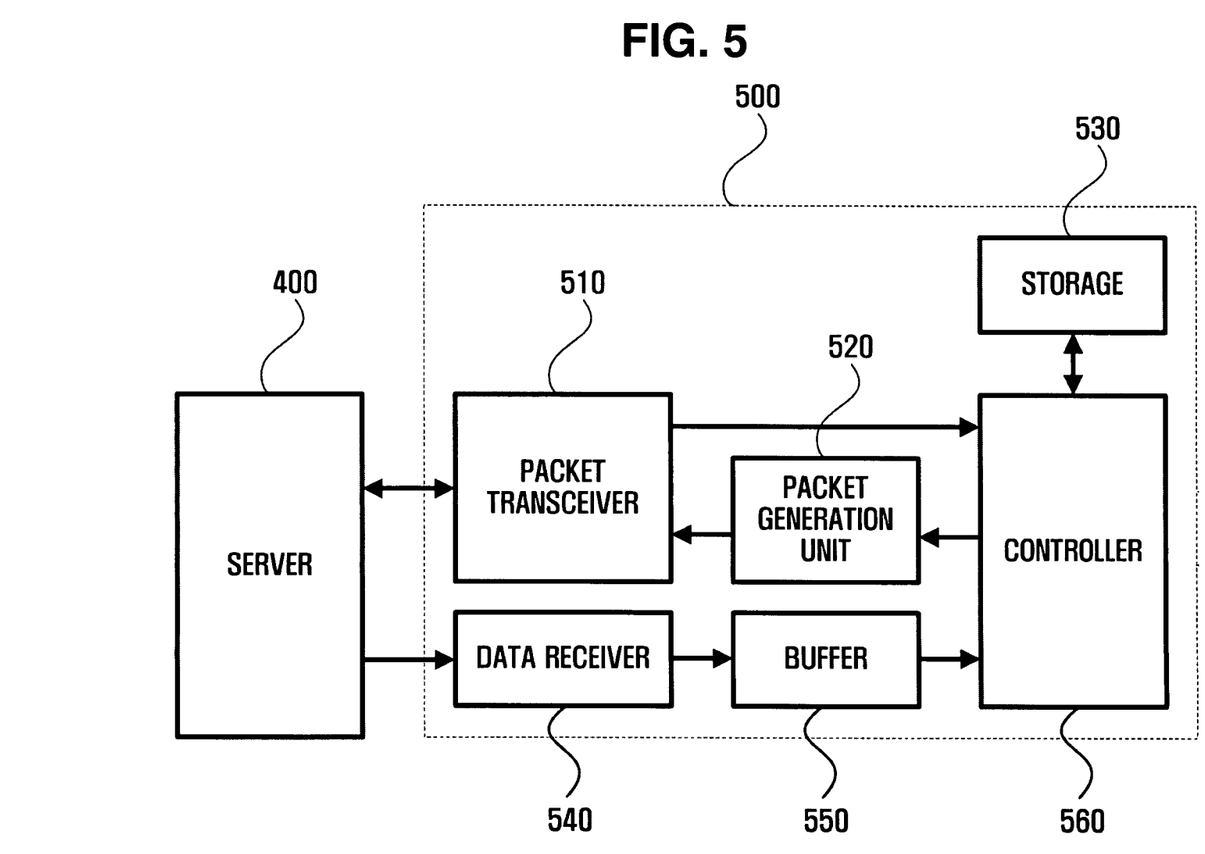
FIG. 5 is a block diagram of a client receiving data services according to an exemplary embodiment of the present invention.

FIG. 5 is a block diagram of a client 500 receiving data services according to an exemplary embodiment of the present invention.

Referring to FIG. 5, the client 500 includes a packet transceiver 510, a packet generation unit 520, a storage 530, a data receiver 540, a buffer 550, and a controller 560.

The storage 530 stores information about data services.

The information contains a data service type, a server name, an IP address, a port number, and a network connection status of a server 400.

The packet generation unit 520 generates a packet to be transmitted to the server 400.

Examples of the packet include an announcement packet, a query packet, a response packet, a request packet, and a termination packet.

An announcement packet generated by the client 500 includes a one-byte packet type, a six-byte hardware address, a four-byte data service type, a one-byte group length, the name of a group the client 500 belongs to, a one-byte client name length, and a client name.

The format of the client announcement packet is as follows:
{0x11, 0x00EF00AB00CD, 0x00000001, 6, GROUP1, 15, My Media Server}

The client 500 sends a group it belongs to, the type of a data service being supported, and its own network information to the server 400 using the announcement packet.

A query packet generated by the client 500 is used to request a response to whether the server 400 provides a specific data service and includes a one-byte packet type and a four-byte data service type.

The client query packet has the following format:
{0x12, 0x00000000}

A response packet generated by the client 500 is sent in response to the server query packet and contains a packet type (one byte), a hardware address (six bytes), a data service type (four bytes), a group length (one byte), the name of a group the client 500 belongs to, a client name length (one byte), and a client name.

The client response packet has the following format:
{0x13, 0x00EF00AB00CD, 0x000000001, 6, GROUP1, 15, My Media Server}

A request packet generated by the client 500 is used to request a specific data service from the server 400 and includes a packet type (one byte), a hardware address (six bytes), a data service type (four bytes), a group length (one byte), the name of a group the client 500 belongs to, a client name length (one byte), and a client name.

The client request packet has the following format:
{0x14, 0x00EF00AB00CD, 0x00000001, 6, GROUP1, 15, My Media Server}

A termination packet created by the client 500 is used to inform the server on the network that the client 500 is terminated and includes a packet type (one byte), a hardware address (six bytes), a data service type (four bytes), a group length (one byte), the name of a group the client 500 belongs to, a client name length (one byte), and a client name.

The client termination packet has the following format:
{0x15, 0x00EF00AB00CD, 0x00000001, 6, GROUP1, 15, My Media Server}

Like the server 400, the client 500 creates a socket using a multicast IP address and a port number and makes packet communication with the server 400 through the socket.

The packet transceiver 510 transmits an announcement packet, a query packet, a request packet, a response packet, or a termination packet generated by the packet generation unit 520 to the client 500 while receiving a server announcement packet, a server query packet, a server response packet, a server request packet, or a server termination packet from the server 400.

First, the server 400 that has joined a network where the client 500 exists distributes an announcement packet for a data service being delivered by the server 400.

The packet transceiver 510 that has received the server announcement packet sends it to the controller 560 that then checks whether the client 500 supports the data service through the type of the data service contained in the server announcement packet.

When the client 500 supports the data service contained in the server announcement packet, the controller 560 instructs the packet transceiver 510 to send a request packet to the server 400.

A server query packet is transmitted to check the status of the client 500 present on the network.

The controller 560 that has received the server query packet from the packet transceiver 510 instructs the packet transceiver 510 to send a response packet.

A server response packet containing a response to a client query packet or a request packet includes a packet type, a data service type, a server name, an IP address, a port number, and the right to receive a data service.

The controller 560 stores the server response packet in the storage 530.

A server termination packet is used to inform all or some of the clients present on the network that the server 400 is terminated.

The client 500 that has received the server termination packet waits for the server 400 to join the network.

A server announcement packet informs the client 500 whether the server 400 will participate on the network.

The data receiver 540 receives data from the server 400 using unicasting.

Since the client 500 can know IP information about the server 400 through the announcement packet and the response packet received from the server 400, the client 500 establishes a unicast network with the server 400 before receiving data.

Data received by the data receiver 540 passes through the buffer 550 before being sent to the controller 560.

The data is temporally stored in the buffer 550 and sent to the controller 560 to match the data processing power of the client 500.

Figure 6:
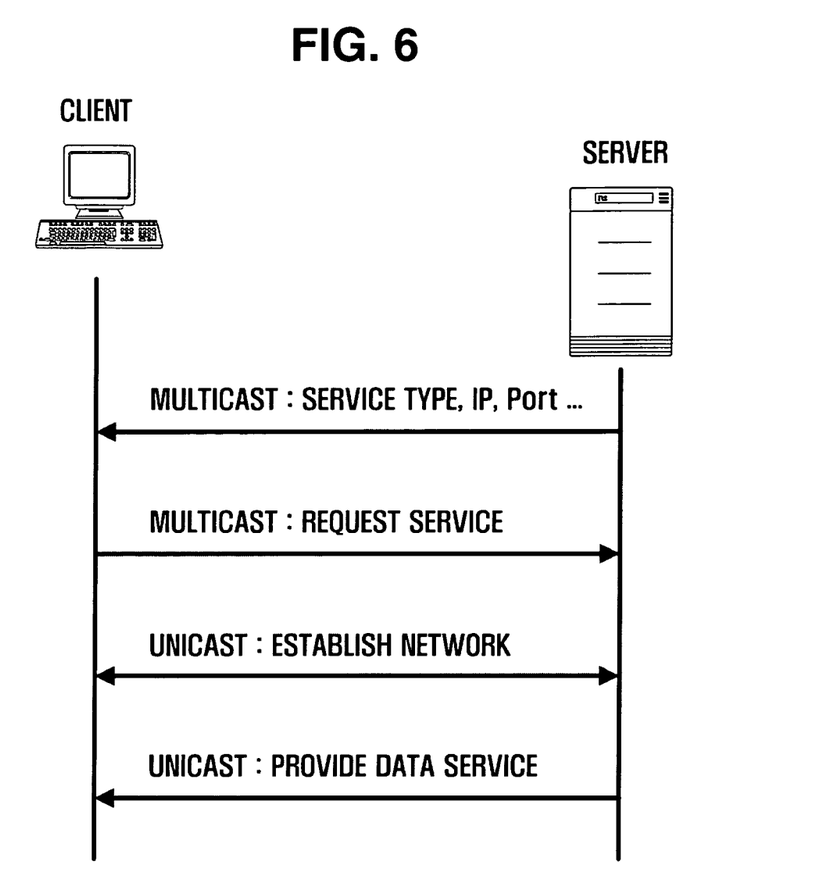
FIG. 6 illustrates a process of a server joining a network in which a client waits for communication according to an exemplary embodiment of the present invention.

FIG. 6 illustrates a process of a server joining a network in which a client waits for communication according to an exemplary embodiment of the present invention.

As shown in FIG. 6, the client participates on the network before the server is connected to the network.

The client uses a multicast IP address and a port number to create a socket and waits for a server announcement packet through the created socket.

When the server joins the network, it also utilizes a multicast IP address and a port number to create a socket and sends an announcement packet through the socket.

The client receives the server announcement packet and checks whether it supports a data service being delivered by the server. If the client supports the data service, it sends a request packet to the server.

The server that has received the request packet requesting transmission of the data service from the client refers to an information management unit, checks whether the client that has sent the request packet is allowed to receive data, and sends the data if the client has the right to do so.

Here, since the announcement packet and the request packet are transmitted and received through a multicast socket, the client can perform packet communication with the server even if it is not aware of an IP address and a port number of the server while receiving data using IP information about the server obtained through the announcement packet and the request packet.

Figure 7:
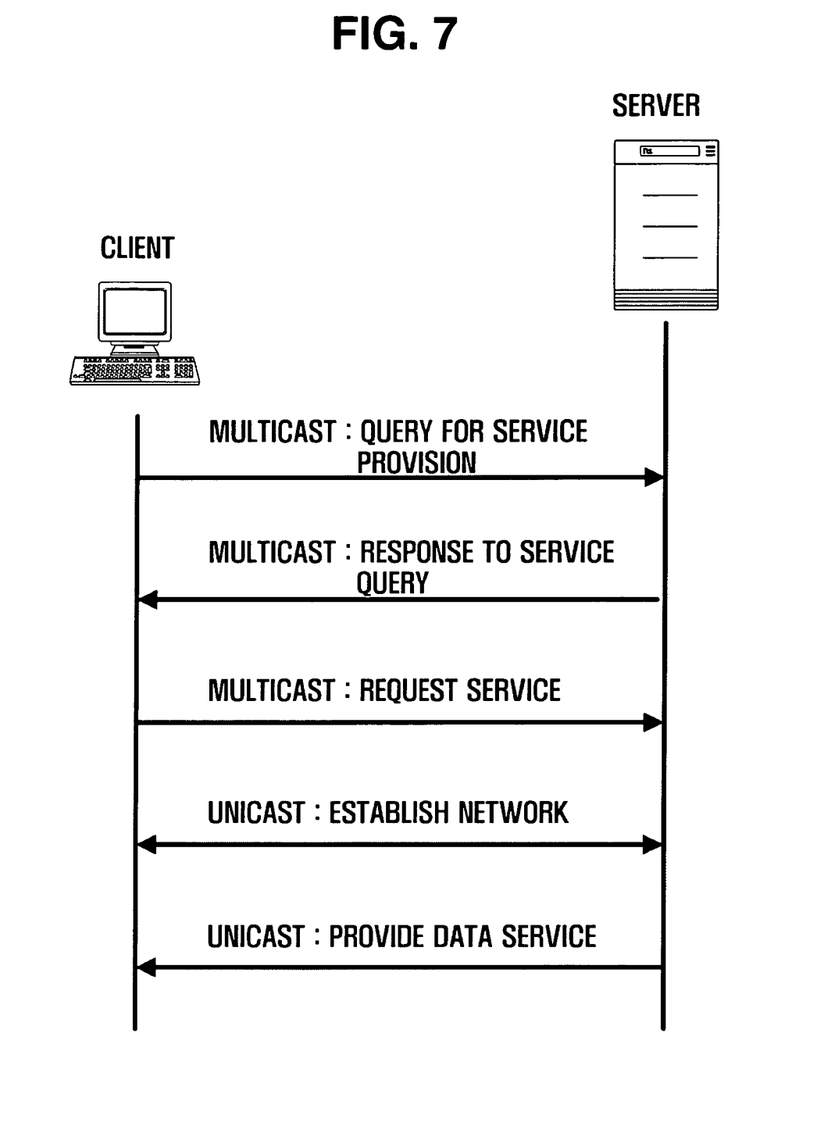
FIG. 7 illustrates a process of a client joining a network in which a server waits for communication according to another exemplary embodiment of the present invention.

FIG. 7 illustrates a process of a client joining a network in which a server waits for communication according to an exemplary embodiment of the present invention.

As shown in FIG. 7, the server participates on the network before the client is connected to the network.

The server uses a multicast IP address and a port number to create a socket and waits for a client announcement packet through the created socket.

When the client joins the network, it also utilizes a multicast IP address and a port number to create a socket and sends an announcement packet through the socket to inform the server on the network that it will join the network.

Then, the client sends a query packet to the server to check whether the server provides a specific data service.

The server that has received the query packet from the client sends a response packet in response to the query packet.

The response packet includes information about whether the server provides the appropriate data service and whether the client that has sent the query packet has the right to receive the data service.

Upon receipt of the response packet, the client stores the response contained in the response packet in a storage for future reference or use.

When the response packet indicates that the server provides the data service and that the client has the right to receive the data service, the client sends a request packet to the server.

The server that has received the request packet establishes a unicast network with the client before sending data.

A system and method for transmitting and receiving data using multicasting according to exemplary embodiments of the present invention have several advantages.

First, in a network environment where a server and a client exist, a packet containing IP information about the other party is transmitted and received using multicasting, thereby enabling IP communication between the server and the client that do not know IP information about the other party.

Second, exemplary embodiments of the present invention make it possible for the server or client that does not know IP information about the other party to know the status of the other party.

Third, it is possible for the server to manage the client by group.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A server for transmitting and receiving data using multicasting, the server comprising:
    an information management unit which stores into a storage medium, information about a client and a group that the client belongs to;
    a packet generation unit which generates a first packet to be transmitted to the client;
    a packet transceiver which transmits, where an Internet Protocol (IP) address of the client is unknown to the server, the first packet to and receives a second packet which includes the IP address of the client from the client through a multicast socket in response to transmitting the first packet; and
    a data transmitter which transmits data service to the client through a unicast network established using the information about the client which is contained in the second packet received from the client,
    wherein the second packet is different from the data service.

2. The server of claim 1, wherein the group comprises clients that are selected from among a plurality of clients supporting a specific data service and satisfying predetermined common requirements.

3. The server of claim 1, wherein the multicast socket comprises a multicast Internet Protocol address assigned to communicate with the client and a data service type.

4. The server of claim 3, wherein the multicast socket further comprises a port number assigned for each group.

5. The server of claim 1, wherein the first packet to be transmitted to the client includes a packet type, a data service type, the name of the server, an Internet Protocol address, and a port number.

6. The server of claim 1, wherein the information about the client includes a type of supported data service, an Internet Protocol address of the client, and a port number of the client for transmission of data service to the client.

7. A client for transmitting and receiving data using multicasting, the client comprising:
    a packet generation unit which generates a first packet to be transmitted to a server providing a data service;
    a packet transceiver which transmits, where an Internet Protocol (IP) address of the server is not known to the client, the first packet to the server through a multicast socket and receives a second packet which includes the IP address of the server from the server in response to transmitting the first packet;
    a storage which stores into a storage medium, information about the server contained in the second packet received from the server; and
    a data receiver which receives, through a unicast network, data service sent from the server, the unicast network established using the information about the server,
    wherein the second packet is different from the data service.

8. The client of claim 7, wherein the first packet to be transmitted to the server includes a packet type, a data service type, the name of the client and a hardware address.

9. The client of claim 7, wherein the information about the server includes the type of a data service being provided by the server, an Internet Protocol address of the server, and a port number of the server for reception of data service from the server.

10. A method of transmitting and receiving data in a server comprising a processor having computing device-executable instructions, the method comprising:

creating, using the processor, a multicast socket;
transmitting, by the server where an Internet Protocol (IP) address of a client is not known to the server, information about a network and a type of data service provided to the client or a group the client belongs to through the multicast socket, to obtain the IP address of the client;
receiving a request packet, which requests transmission of the data service, through the multicast socket in response to transmitting the information;
determining whether the client that has sent the request packet has a right to receive the data service; and
providing the data service to the client through a unicast network established using information about the client contained in the request packet, if it is determined that the client is allowed to receive the data service,
wherein the request packet is different from the data service.

11. The method of claim 10, wherein the multicast socket comprises a multicast Internet Protocol address assigned to communicate with the client and a data service type.

12. The method of claim 11, wherein the multicast socket further comprises a port number assigned for each group.

13. The method of claim 10, wherein the group comprises clients that are selected from among a plurality of clients supporting a specific data service and satisfying predetermined common requirements.

14. The method of claim 10, wherein the information to be transmitted to the client includes a packet type, a data service type, the name of the server, an Internet Protocol address, and a port number.

15. The method of claim 10, wherein the information about the client includes a type of supported data service, the IP address of the client, and a port number of the client for transmission of data service to the client.

16. A method of transmitting and receiving data in a client comprising a processor having computing device-executable instructions, the method comprising:

creating, using the processor, a multicast socket;
receiving, by the client where an Internet Protocol (IP) address of a server is not known to the client, a type of a data service and network information for receiving the data service through the multicast socket from the server, to obtain the IP address of the server;
determining whether the data service is supported;
transmitting a packet requesting transmission of the data service, through the multicast socket, when the data service is supported in response to receiving the network information which includes the IP address of the server; and
receiving data service through a unicast network established using the network information,
wherein the packet is different from the data service.

17. The method of claim 16, wherein the network information includes the IP address of the server providing the data service and a port number of the server for receiving data service from the server.

18. The server of claim 1, further comprising:

a controller which determines, using information contained in the second packet, whether the client is allowed to receive the data by referring to the information about the client stored by the information management unit,
wherein if the controller determines that the client is allowed to receive the data, the controller controls the data transmitter to transmit the data to the client, and if the controller determines that the client is not allowed to receive the data, the controller controls the data transmitter to transmit a response packet indicating that the client has no right to receive the data.

19. The client of claim 7, further comprising:

a controller which determines whether the client supports the data service provided by the server, and controls the packet transceiver to transmit the first packet to the server if the client is determined to support the data service provided by the server,
wherein the data receiver receives the data sent from the server if the client is allowed to receive the data from the server, and receives a response packet indicating that the client has no right to receive the data if the client is not allowed to receive the data from the server.

* * * * *